July 3, 1951  T. E. PIAZZE  2,558,780
TOBACCO POUCH AND METHOD OF MAKING SAME
Filed Aug. 11, 1945  3 Sheets-Sheet 1
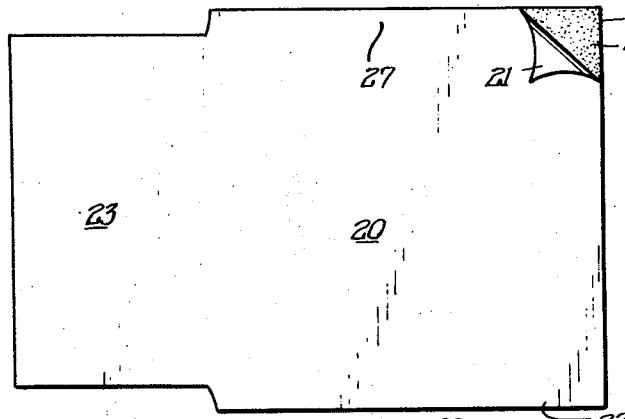
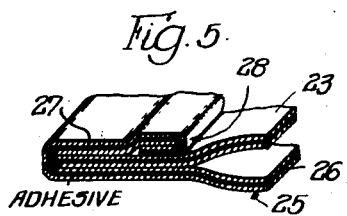
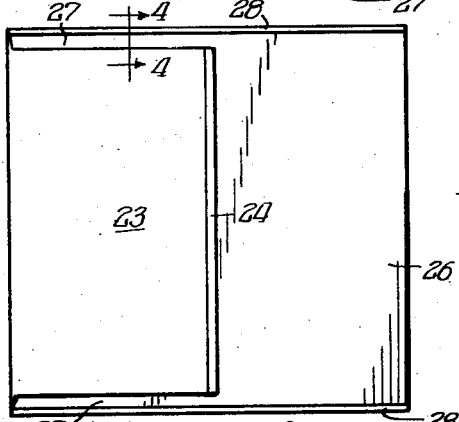
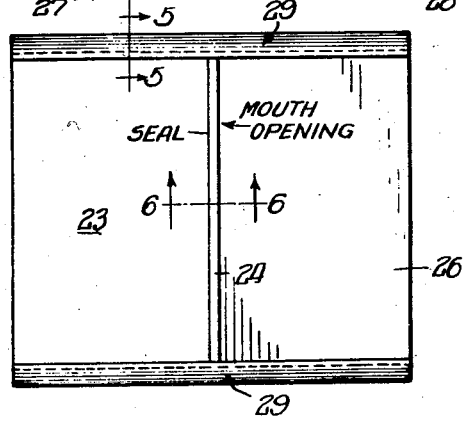
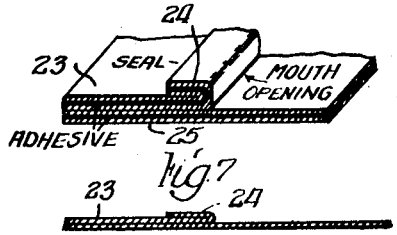
INVENTOR.
Thomas E. Piazze,
BY
Cromwell, Greist + Warden
Attys.

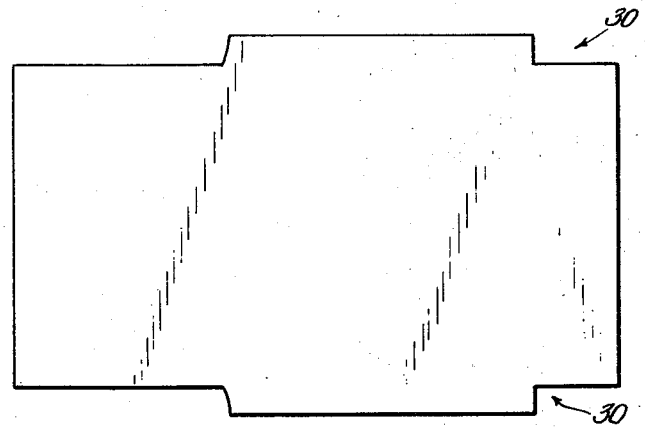
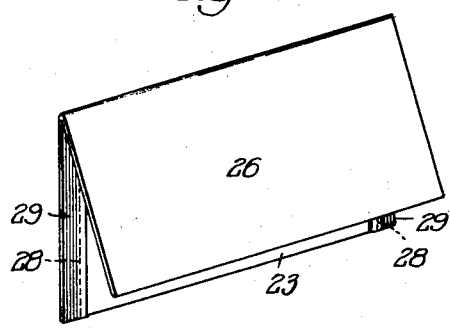
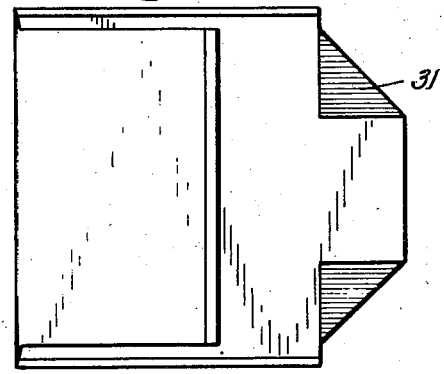
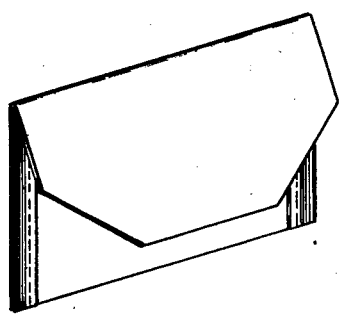
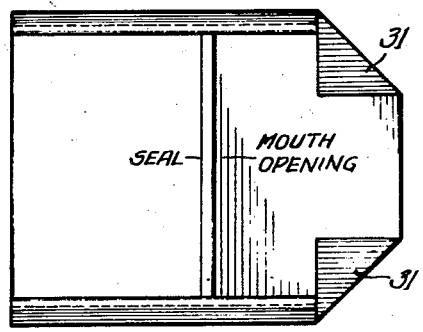

July 3, 1951   T. E. PIAZZE   2,558,780
TOBACCO POUCH AND METHOD OF MAKING SAME
Filed Aug. 11, 1945   3 Sheets-Sheet 3
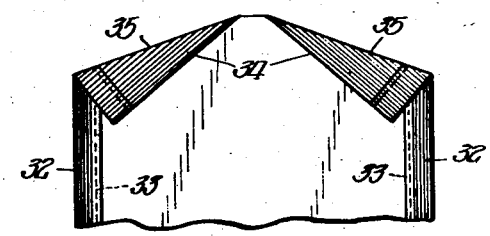
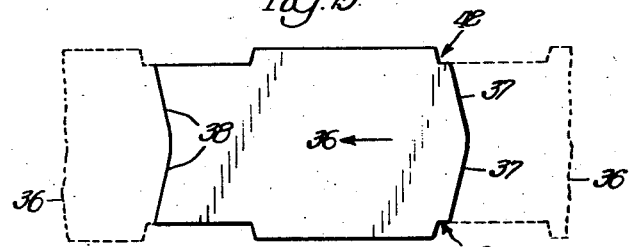
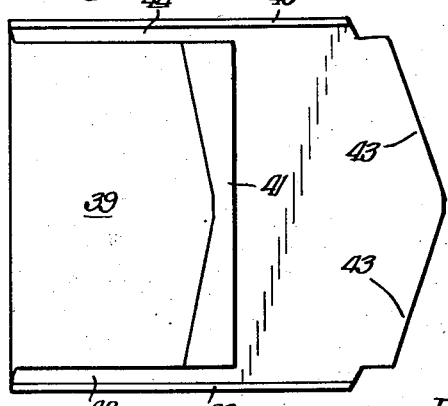
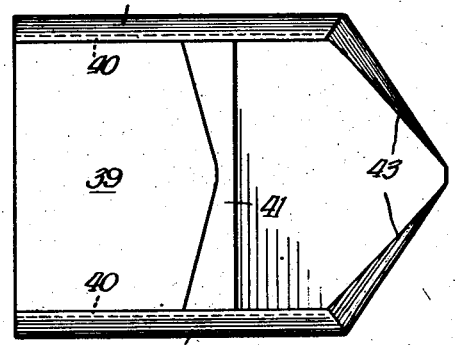
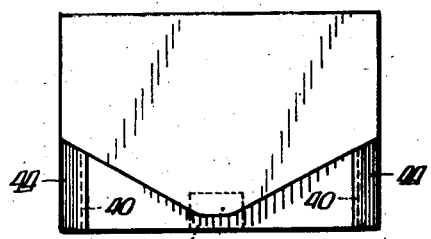
INVENTOR.
Thomas E. Piazze.
BY
Cromwell, Greist + Warden
ATTYS Patented July 3, 1951

2,558,780

UNITED STATES PATENT OFFICE 2,558,780

TOBACCO POUCH AND METHOD OF MAKING SAME

Thomas E. Piazze, Mount Vernon, Ohio, assignor, by mesne assignments, to Shellmar Products Corporation, Mount Vernon, Ohio, a corporation of Delaware Application August 11, 1945, Serial No. 610,267

14 Claims. (Cl. 229—80)

This invention relates to the manufacture of pouches. More specifically, it pertains to an improved type of tobacco pouch, and method of making the same, wherein there is provided a reinforced construction throughout the pouch, especially in the seams, across the mouth opening and elsewhere, the invention even more particularly being an improvement on the type of pouch disclosed in a copending application of Paul M. Gilfillan, Serial No. 461,530, filed October 10, 1942, now Patent No. 2,392,848.

In the Gilfillan pouch there has been provided a very desirable type of container for holding in hermetically sealed and sift-proof condition a commodity such as, for example, tobacco. However, certain disadvantages have been recognized for a long time in the structure of that type of pouch. For example, tearing of the lip constituting the marginal edge of the front wall along the mouth closure and also tearing of the sealing flaps where they overlie the front wall across the marginal portion forming the mouth closure is common and this almost always occurs after a short period of use. It has long been felt that it would be a distinct advantage to overcome these conditions and this is accomplished by means of the present invention.

Generally, therefore, it is an object of the present invention to provide a pouch of the character described, and a method for making the same, which will overcome the foregoing difficulties and disadvantages, which is simple yet sturdy and durable in construction, economical to manufacture, and well suited to the purposes for which it is intended.

It is an object of the invention to provide such a pouch, and method of making the same, in which marginal portions of the sealing flaps are folded over upon themselves to provide reinforcing edges therefor and for holding the front wall of the pouch and mouth closure in sealed reinforced position.

Another object of the invention is the provision of such a pouch, and method of making the same, in which the sealing flaps also extend along the closure member, and marginal portions of the sealing flaps along both the front wall section and the closure member are folded over upon themselves to provide reinforcing edges therefor when the sealing flaps are folded over and sealed to the front wall of the pouch as well as to the closure flap to secure the front wall and mouth closure in reinforced position.

A further object of the invention is the provision of such a pouch, and method of making the same, in which a marginal edge of the front wall constituting the pouch portion is folded over upon itself in any suitable manner to provide a reinforcing edge therefor, and preferably outwardly additionally to provide a gripping lip to open the seal of the pouch after the sealing flaps have been folded over upon the front wall and sealed thereto.

Still another object of the invention is the provision of such a pouch, and method of making the same, wherein corner portions of the closure flap are diagonally folded upon the same thereby to provide a reinforced construction for a closure flap; and which additionally will materially aid in breaking the seal when the package is opened by the user.

Another object of the invention is the provision of an hermetically sealed pouch of the type herein disclosed, and method of making the same, in which a marginal portion along the mouth closure is folded upon itself to provide a reinforced edge therefor, and the front wall, after the pouch has been filled, is sealed across the mouth opening to the rear wall between the sealing flaps to provide an hermetically sealed pouch.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a plan view of a preferred form of blank for making a pouch embodied by the present invention;

Fig. 2 is a plan view illustrating a further development in the manufacture of the pouch in which a portion thereof is folded over upon itself;

Fig. 3 is a plan view illustrating a still further development of the construction of the pouch shown in Figs. 1 and 2 as the same appears when completed and ready for filling;

Fig. 4 is an enlarged transverse sectional view of a portion of the pouch when made from laminated materials taken along the lines 4—4 of Fig. 2, and looking in the direction of the arrows;

Fig. 4a is an enlarged view similar to Fig. 4 illustrating the construction of the pouch when made from a blank of unlaminated material;

Fig. 5 is an enlarged view similar to Fig. 4 of a completed seam construction taken along the lines 5—5 of Fig. 3, and looking in the direction of the arrows;

Fig. 5a is an enlarged view similar to Fig. 4a illustrating a section of a seam through a pouch made from an unlaminated blank of pouch material;

Fig. 6 is an enlarged transverse sectional view taken along the line 6—6 of Fig. 3 and looking in the direction of the arrows;

Fig. 7 is an enlarged view similar to Fig. 6 illustrating a seam construction of a pouch made from a single blank of unlaminated material;

Fig. 8 is a plan view illustrating a modified form of blank embodied by the present invention;

Fig. 9 is a plan view of the blank of Fig. 8 with marginal folds, and being folded over upon itself with diagonal end folds at opposite corners of the mouth closure member;

Fig. 10 is a plan view of a completed pouch of the modified type;

Fig. 11 is a perspective view of a filled pouch of the type shown in Fig. 3 and with the closure member, or cover, partly raised for illustrative purposes;

Fig. 12 is a view similar to Fig. 11 illustrating the pouch of Fig. 10 filled, and with the cover also partly raised for the same reason;

Fig. 13 is a plan view of a fragmentary portion of the end of a closure member such as that shown in Fig. 3;

Fig. 14 illustrates a novel method of folding and sealing corner portions of the closure member depicted in Fig. 13 to provide reinforced corner edges;

Fig. 15 is a plan view of a further modification of a blank for providing a novel pouch construction and closure member, showing in dotted line portions fragmentary sections of a web from which the blank is cut;

Fig. 16 illustrates a method of providing reinforced side, mouth and closure member edges of the blank of Fig. 15 with a portion of the pouch folded upon itself;

Fig. 17 illustrates a further development in the structure for completing a pouch of the type shown in Fig. 16; and Fig. 18 illustrates such a pouch as that shown in Fig. 16 filled and with the closure member sealed to the body thereof.

Referring more particularly to the drawings, there is shown in Fig. 1 a substantially rectangularly shaped blank 20, preferably of laminated construction. In this view a corner of one lamina is turned down to illustrate the laminated blank. A laminated type of blank which I prefer in the manufacture of pouches, and in particular tobacco pouches, consists of a layer of heat-sealable material 21 laminated to a web 22 of, for example, Glassine by means of a laminating adhesive preferably constituting a microcrystalline wax. This type of an adhesive and construction is employed for the same purposes as disclosed in the above mentioned Gilfillan patent. It should be understood, and it will more fully appear hereinafter from the disclosure, that the lamina 21 may be any suitable heat-sealable material, such as, rubber hydrochloride or any equivalent material, or a heat-sealing cellophane, or the like.

After a cut blank has been provided, as shown at 20, Fig. 1, the narrower portion 23 of the blank is folded over upon the wider portion as illustrated in Fig. 2. This will provide the front wall in the ultimate construction of the pouch. At the same time a marginal edge 24 of the front wall along the mouth closure of the flap is folded over upon itself, in either direction, but preferably outwardly so that the same does not adhere to itself. This provides an excellent reinforcing edge along the mouth closure opening and, when folded outwardly, will provide a loose lip for gripping purposes which will facilitate testing and breaking of the hermetic seal across the mouth closure area. That portion of the remainder of the pouch underlying the front wall 23 constitutes the rear wall of the pouch, indicated generally at 25 (Figs. 5 and 6), and the portion extending beyond the front wall provides a mouth closure flap 26 for the mouth closure (Fig. 6).

The portions of the rear wall and closure flap extending beyond the side edges of the front wall 23 constitute sealing flaps 27. Each of these sealing flaps also is marginally folded upon itself as indicated at 28 leaving exposed heat-sealable surfaces. These marginally folded portions also provide excellent reinforcing edges and can, if desirable, be sealed along this folded portion, that is, when they are folded upon themselves.

As a further step in the construction of the pouch as shown in Fig. 3, the sealing flaps 27, 27, together with their marginally reinforced edges 28, 28, are folded over upon the front wall 23 of the pouch, across the marginal fold 24 along the top of the front wall of the pouch, and along the closure portion 26. Because of the exposed heat-sealable surface along the sealing flaps 27, 27, adjacent the marginally folded edges 28, 28, the front wall is sealed thereto and held in sealed and reinforced position. Of course, at the same time the marginal portions of the front wall and rear wall, where they are in face-to-face contact with each other, will also be heat-sealed together. In the case of rubber hydrochloride, for example, there is actually a fusion of the parts so that a unitary mass, or autogenous bond, is provided. While materials as Pliofilm are preferable, if obtainable, heat-sealing cellophane, for example, will also provide an excellent pouch construction when made in accordance with the present disclosure.

It will be observed that the sealing flaps 27, 27, are also preferably heat-sealed to the mouth closure flap 26 where they are folded upon the same and this gives a continuous reinforced edge construction to the pouch along its entire marginal edge constituting the front and rear walls, as well as the closure flap portion.

It will further be noted by this construction that the marginal edges of the final heat seal preferably are crimped as indicated at 29, 29, and this provides an excellent seam construction. Because of the double marginal folds 24, 24, and 28, 28, especially where they overlie each other, there has now been provided an improved pouch which, in these areas especially, is the strongest portion of the pouch where heretofore it was the weakest portion.

In the modification illustrated in Figs. 8 through 10 there is shown a similar type of blank as that indicated in Fig. 1. The only difference, however, is that opposite corner sections of the closure member have been cut out as indicated at 30, 30. The pouch has the same reinforcing folds marginally along the sealing flaps 27, 27, as well as along the mouth opening 24 at the marginal edge of the front wall. Furthermore, the remainder of the pouch is folded and sealed the same way in which the aforementioned preferred embodiment is constructed. However, at the ends of the closure flap adjacent the cut-out portions 30, 30, the corners are diagonally folded over upon the sealing flap as indicated at 31, 31, Fig. 9.

When the sealing flaps have been folded over and secured to provide the ultimate side seam construction as indicated in Fig. 10, and the pouch properly has been filled and sealed across the mouth opening, there is provided a pouch construction in which a mouth closure portion, or cover flap, has a reinforced edge construction substantially throughout its perimeter. These diagonally folded corner portions prevent curling as well as separation of laminated material when that type of blank is used and, while such a construction is not confined to blanks made from laminated materials, it is considered preferable for this type of pouch structure.

Figs. 11 and 12 illustrate the types of pouches formed by the two embodiments set forth in Figs. 3 and 10 respectively, after the same have been filled and properly sealed across their mouth openings to provide hermetically sealed pouches.

In the modification shown in Fig. 13 it will be seen that marginal portions of the sealing flaps 32 have been turned inwardly as at 33 to provide reinforced edges as in the preferred structure. It will also be noted that the sealing flaps so turned over extend to the end of the closure member. In providing a novel type of reinforced edge the corner members, including the extensions of the sealing flaps are turned over on each side of an intermediate section of the closure member as indicated at 34 and these are sealed to the closure member itself. This provides a tapered type of closure member which has a reinforcing edge 35 substantially completely across its terminal. The purpose of this will more fully appear hereinafter.

In Fig. 15 a blank 36 is depicted in solid line position showing its configuration as cut from a traveling web indicated in dotted line position. It will be observed that the leading edge of the blank is cut diagonally, that is, on each side of an intermediate section the same is cut back toward the body of the pouch in a tapering manner as indicated at 37. It will also be observed that the end of the blank will be cut so as to extend inwardly as at 38 in a manner to coincide substantially with the tapered cut 37. Each blank thus cut from the running web will have this configuration.

In Fig. 16 the blank is folded upon itself to provide a front wall 39 in a manner similar to that depicted in connection with the pouches heretofore illustrated. Also, marginal portions 40 are turned over to provide reinforcing edges for the sealing flaps. Similarly, the front wall edge of the pouch is turned outwardly to provide a broader and angular reinforcing lip 41.

It will be observed by referring again to blank 36 that it is illustrated as having cut out corner portions indicated generally at 42 and this is preferable for this type of construction. By referring again to Fig. 16 it will be observed that the tapered extensions of the leading edge of the cover closure member are in position to be folded over and sealed to the closure member. Preferably, the folded corner portions 43 are folded over and upon the sides of the sealing flaps 44.

It will be seen from Fig. 17 that all edges carrying any tearing stress or strain whatsoever are completely reinforced. The importance of the angular closure portion with the reinforced edge lies in its ability to tear, or break, revenue stamps when placed in the conventional position indicated in the closed package illustrated in Fig. 18 at 45. It appears that approximately 80 per cent of the breakage in tearing of the closure member occurs where the same is held to the body of the pouch by means of the revenue stamp because the user places his finger underneath the closure member to tear away the stamp. However, the reinforced edge tends to eliminate the tearing of any portion of the cover in this region, and because of its angular construction, aids materially in readily and easily tearing the stamp itself, as well as preventing the corners of the closure members from rolling or curling while the package is in use.

With respect to all of the modifications of the corner folds of the closure member it will be seen that in addition to their reinforcing and tearing features and advantages there is lent to the various pouches an improved appearance.

It will thus be seen that the objects hereinbefore set forth may readily and efficiently be attained and since certain changes in carrying out the above method, and certain modifications in the article which embody the invention may be made without departing from its scope, it is intended that all matter contained in the above description or shown in the accompanying drawings shall be interpreted as illustrative and not in a limiting sense.

It is also to be undertsood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a pouch of the character described, which comprises a blank of heat-sealable material folded upon itself to provide front and rear walls for said pouch leaving a mouth closure, a closure member extending from said rear wall and being foldable across said mouth closure, and said rear wall having sealing flaps along each side thereof, the improvement comprising marginal portions of said sealing flaps being folded over upon themselves along opposite portions of the rear wall adjacent the front wall and along the closure member to provide a rounded reinforced edge for each of said flaps leaving a heat-sealable surface along the flaps, and said flaps being folded upon said front wall and sealed thereto along said heat-sealable surfaces, leaving said reinforced edge unsealed with respect to said front wall.

2. In a pouch of the character described, which comprises a blank of heat-sealable material folded upon itself to provide front and rear walls for said pouch leaving a mouth closure, a closure member extending from said rear wall and being foldable across said mouth closure, and said rear wall having sealing flaps along each side thereof and extending along said closure member, the improvement comprising marginal portions of said sealing flaps being folded over upon themselves along opposite portions of the rear wall adjacent the front wall and along the closure member to provide a rounded reinforced edge for said flaps leaving a heat-sealable surface along the flaps, and said flaps being folded over marginally upon said front wall and folded over marginally on said closure member and being sealed thereto along said heat-sealable surfaces, leaving said reinforced edge unsealed with respect to said front wall and said closure member.

3. In a pouch of the character described, which comprises a blank of heat-sealable material folded upon itself to provide front and rear walls for said pouch leaving a mouth closure and a closure member extending from said rear wall which is foldable across said mouth closure, and said rear wall, including said closure member, having sealing flaps along each side thereof, the improvement comprising a marginal portion along said mouth closure being folded outwardly over upon itself with the heat-sealing surface exposed to provide a rounded reinforced edge therefor, and said sealing flaps being folded over upon said front wall and being heat-sealed thereto and across the ends of said marginally outwardly folded over portion along said mouth closure, said folded over marginal portion providing a tab for use in breaking the heat seal along said mouth closure after said pouch has been filled and sealed.

4. In a pouch of the character described, which comprises a blank of heat-sealable material folded upon itself to provide front and rear walls for said pouch leaving a mouth closure and a closure member extending from said rear wall, which closure member is foldable across said mouth closure, and said rear wall having sealing flaps along each side thereof and along said closure member, the improvement comprising marginal portions of said sealing flaps being folded over upon themselves to provide a reinforced edge for each of said flaps and leaving a heat-sealable surface along the flaps and adjacent to the side edge of the front wall, corner portions of said closure member being diagonally folded over and sealed upon said underlying closure member to provide reinforced corner edges, and said sealing flaps being folded over upon said front wall and sealed thereto to provide a reinforced side seam construction.

5. In a pouch of the character described, which comprises a blank of heat-sealable material folded upon itself to provide front and rear walls for said pouch leaving a mouth closure and a closure member extending from said rear wall and being foldable across said mouth closure, and said rear wall having sealing flaps along each side thereof, the improvement comprising marginal portions of said sealing flaps being folded over upon themselves along opposite portions of the rear wall adjacent the front wall and along the closure member to provide a reinforced edge for each of said flaps and leaving a heat-sealable surface along the flaps, said sealing flaps being folded upon said front wall and sealed thereto along said heat-sealable surfaces, leaving said reinforced edge unsealed with respect to said front wall, a marginal portion along said mouth closure being folded upon itself to provide a reinforced edge therefor, and said front wall, after said pouch has been filled, being sealed across the mouth opening to the rear wall between the sealing flaps to provide an hermetically sealed pouch, and said sealing flaps being sealed along their heat-sealable surfaces to said folded over portion along said mouth closure, said marginal portions of said sealing flaps overlying said marginal portion along the mouth closure being unsealed.

6. In the method of manufacturing pouches of the character described, which comprises folding a blank of heat-sealable material upon itself to provide front and rear walls for said pouch leaving a mouth closure and a closure member extending from said rear wall and being foldable across said mouth closure, and providing said rear wall with sealing flaps along each side thereof, the improvement comprising folding over upon themselves marginal portions of said sealing flaps to provide a reinforced edge for each of said flaps and leaving a heat-sealable surface along the flaps between said edge and said front wall, folding over upon itself corner portions of the closure members and sealing the same thereto to provide reinforced corner edges therefor, and folding said sealing flaps over upon said front wall and sealing the same thereto leaving said edge unsealed.

7. In the method of manufacturing pouches of the character described, which comprises folding a blank of heat-sealable material upon itself to provide front and rear walls for said pouch leaving a mouth closure and a closure member extending from said rear wall and being foldable across said mouth closure, and providing said rear wall with sealing flaps along each side thereof, the improvement comprising folding marginal portions of said sealing flaps over upon themselves to provide a reinforced edge for each of said flaps and leaving a heat-sealable surface along the flaps between said edge and said front wall, folding said sealing flaps over upon said front wall and sealing the same thereto leaving said edge unsealed, folding a marginal portion along said mouth closure outwardly over upon itself to provide a reinforced edge therefor, and after filling said pouch sealing the mouth closure to the rear wall between the sealing flaps to provide an hermetically sealed pouch.

8. A pouch as defined in claim 4, in which the sealing flaps terminate short of the ends of the corner portions of the closure member, and each corner portion being so folded as to have an edge thereof lying adjacent the end of a sealing flap.

9. A pouch as defined in claim 4, and in which the end of each sealing flap along the closure is included in the corner fold and sealed underneath the same and said closure being so folded as to include substantially said entire corners and to terminate said closure at an intermediate point to provide a reinforced and seal breaking edge.

10. A pouch as defined in claim 4, in which the end of the closure member tapers in a direction toward the mouth opening from an intermediate portion in the center thereof, and the corner sections to each side of said center portion being folded upon said closure to provide a reinforced seal breaking edge closure for said closure member.

11. In the method of manufacturing pouches of the character described, which comprises folding a blank of heat-sealable material upon itself to provide front and rear walls for said pouch leaving a mouth closure and a closure member extending from said rear wall and being foldable across said mouth closure, and providing said rear wall and closure member with sealing flaps along each side thereof, the improvement comprising folding and sealing marginal portions of said sealing flaps over upon themselves to provide a reinforced edge for each of said flaps and leaving a marginal heat-sealable surface along the flaps between said edge and said front wall, and folding said sealing flaps over upon said front wall so that each sealing flap is wrapped contiguous the end portion of the front wall throughout the latter's length and sealing the same thereto leaving said edge unsealed, and sealing together the marginal edges of the front and rear walls underlying the sealing flaps.

12. In the method of manufacturing pouches of the character described, which comprises folding a blank of heat-sealable material upon itself to provide front and rear walls for said pouch leaving a mouth closure and a closure member extending from said rear wall and being foldable across said mouth closure, and providing said rear wall with sealing flaps along each side thereof and extending along said closure member, the improvement comprising folding over upon themselves marginal portions of said sealing flaps and sealing the same to provide a reinforced edge for each of said flaps and leaving a heat-sealable surface along the flaps between said edge and said front wall, and folding said sealing flaps over upon said front wall so that each sealing flap is wrapped contiguous the end portion of the front wall throughout the latter's length and said closure member and sealing the same thereto leaving said edge unsealed, and sealing together the marginal edges of the front and rear walls underlying the sealing flaps.

13. In the method of manufacturing pouches of the character described, which comprises folding a blank of heat-sealable material upon itself to provide front and rear walls for said pouch leaving a mouth closure and a closure member extending from said rear wall and being foldable across said mouth closure, and providing said rear wall with sealing flaps along each side thereof, the improvement comprising folding over upon itself opposite marginal portions of the sealing flaps to provide rounded reinforced edges therefor leaving a heat-sealable area between said edges and the edges of the front wall, and folding said sealing flaps over upon said front wall so that each sealing flap is wrapped contiguous the end portion of the front wall throughout the latter's length and across the mouth closure and sealing the heat-sealable area thereto leaving said edges unsealed with respect to said front wall and closure member, and sealing together the marginal edges of the front and rear walls underlying the sealing flaps.

14. In the method of manufacturing pouches of the character described, which comprises folding a blank of heat-sealable material upon itself to provide front and rear walls for said pouch leaving a mouth closure and a closure member extending from said rear wall and being foldable across said mouth closure, and providing said rear wall and closure member with sealing flaps along each side thereof, the improvement comprising folding marginal portions of said sealing flaps over upon themselves to provide a reinforced edge for each of said flaps and leaving a marginal heat-sealable surface along the flaps between said edge and said front wall, and folding said sealing flaps over upon said front wall so that each sealing flap is wrapped contiguous the end portion of the front wall throughout the latter's length and sealing the same thereto leaving said edge unsealed, and sealing together the marginal edges of the front and rear walls underlying the sealing flaps.

THOMAS E. PIAZZE.

REFERENCES CITED

The following references are of record in the file of this patent:

UNITED STATES PATENTS

| Number | Name | Date |
| --- | --- | --- |
| 1,213,769 | Jacobs | Jan. 23, 1917 |
| 1,316,737 | Parks | Sept. 23, 1919 |
| 1,915,503 | Schmidt | June 27, 1933 |
| 1,960,232 | Corbe | May 29, 1934 |
| 2,092,858 | Richards | Sept. 14, 1937 |
| 2,114,380 | Heywood | Apr. 19, 1938 |
| 2,161,474 | Klein | June 6, 1939 |
| 2,322,654 | Moore | June 22, 1943 |
| 2,392,848 | Gilfillan | Jan. 15, 1946 |

FOREIGN PATENTS

| Number | Country | Date |
| --- | --- | --- |
| 213,865 | Great Britain | Apr. 10, 1924 |